United States Patent
Dubois et al.

(10) Patent No.: US 11,652,381 B2
(45) Date of Patent: May 16, 2023

(54) SUPPLY OF POWER TO A LOAD IN AN ELECTRICAL ARCHITECTURE

(71) Applicant: THALES, Courbevoie (FR)

(72) Inventors: Eric Ravindranath Dubois, Chatou (FR); Hocine Kherbouchi, Chatou (FR); Stéphane Guguen, Chatou (FR); Kamel El Koraichi, Chatou (FR)

(73) Assignee: THALES, Courbevoie (FR)

( * ) Notice: Subject to any disclaimer, the term of this patent is extended or adjusted under 35 U.S.C. 154(b) by 74 days.

(21) Appl. No.: 17/124,402

(22) Filed: Dec. 16, 2020

(65) Prior Publication Data

US 2021/0226500 A1 Jul. 22, 2021

(30) Foreign Application Priority Data

Dec. 20, 2019 (FR) ...................................... 1915038

(51) Int. Cl.
*H02K 3/50* (2006.01)
*H02K 11/33* (2016.01)
*H02K 11/40* (2016.01)
*H01B 9/02* (2006.01)

(52) U.S. Cl.
CPC ................ *H02K 3/50* (2013.01); *H01B 9/02* (2013.01); *H02K 11/33* (2016.01); *H02K 11/40* (2016.01); *H02K 2203/03* (2013.01); *H02K 2203/15* (2013.01)

(58) Field of Classification Search
CPC .......... H02K 3/50; H02K 11/33; H02K 11/40; H02K 2203/03; H02K 2203/15; H02K 11/26; H02K 11/02; H01B 9/02
See application file for complete search history.

(56) References Cited

U.S. PATENT DOCUMENTS

| 4,323,804 A | 4/1982 | Zelt | |
| 2010/0097023 A1 | 4/2010 | Nakamura et al. | |
| 2018/0083514 A1* | 3/2018 | Xiao | H02K 11/33 |
| 2019/0206606 A1* | 7/2019 | Dubois | H01F 3/10 |

FOREIGN PATENT DOCUMENTS

| DE | 10 2016 203 391 A1 | 9/2017 |
| JP | 2005183654 A * | 7/2005 |
| WO | 2017/062254 A1 | 4/2017 |

OTHER PUBLICATIONS

JP2005183654 (A) English translation (Year: 2022).*
DE102016203391A1 English translation (Year: 2022).*

* cited by examiner

*Primary Examiner* — Tulsidas C Patel
*Assistant Examiner* — Viswanathan Subramanian
(74) *Attorney, Agent, or Firm* — BakerHostetler

(57) ABSTRACT

A filtering of a load in an electrical architecture is provided. The load is equipped with power supply terminals allowing it to be connected to an electrical line of the architecture. The electrical architecture comprises, in addition to the connection to the electrical line and associated with each of the power supply terminals, an insulated electrical conductor connected, at a first of its ends, to the terminal under consideration, and not connected at a second of its ends.

12 Claims, 4 Drawing Sheets

SUPPLY OF POWER TO A LOAD IN AN ELECTRICAL ARCHITECTURE

CROSS-REFERENCE TO RELATED APPLICATIONS

This application claims priority to foreign French patent application No. FR 1915038, filed on Dec. 20, 2019, the disclosure of which is incorporated by reference in its entirety.

FIELD OF THE INVENTION

The invention relates to the supply of power to a load in an electrical architecture. The invention is highly suitable for an electrical network on board a vehicle. The invention is particularly useful in the field of aeronautics, in which the current trend is to increase the amount of electrical equipment and thus the on-board electrical power.

BACKGROUND

An aeroplane generally comprises a large number of electrical loads that are supplied with power by an on-board electrical supply network. For example, the aeroplane flight controls, the air-conditioning system and the internal lighting system employ three-phase AC electric machines. The electrical energy supplied to these machines comes from power converters connected to an on-board network that provides electrical energy in the form of DC or AC current. The on-board network may for example comprise electric generators, storage batteries, or even means for connecting to an electrical supply network which is external to the aeroplane and which allows electricity to be supplied to the aeroplane when it is parked at an airport. Aeroplanes often contain 27 V or 540 V DC networks and/or 115 V or 230 V, 400 Hz AC networks. As is known, power converters receive energy from the on-board network to convert it into polyphase AC energy that matches the power and frequency requirements of the load. When a converter is supplied with power by an AC network, the converter comprises, for example, a rectifier that delivers a DC voltage, followed by an inverter that produces the AC voltage required for the load on the basis of the DC voltage. When a converter is supplied with power by a DC network, the converter then comprises a circuit that performs the function of an inverter and produces the AC voltage directly on the basis of the DC voltage of the on-board network. A converter may be dedicated to a load or common to a plurality of loads.

On board a vehicle and notably an aircraft, the converters are generally separate from the electrical loads that are supplied with power. This separation has numerous advantages. First of all, separation allows the converters to be pooled, and these are thus able to supply power to several different loads, notably when the loads are used only sporadically. Pooling makes it possible to reduce the mass on board an aircraft. Next, the reliability of the converters and of the loads may be highly different and, in order to maintain the architecture, it is useful to be able to intervene separately on a converter and on the load to which it supplies power.

The converters generally comprise electronic switches that couple the on-board network to the various phases supplying power to the load. The electronic switches are for example insulated-gate field-effect transistors, commonly called MOSFETs (abbreviation for metal-oxide semiconductor field-effect transistor). Insulated-gate bipolar transistors, commonly called IGBTs, are also encountered.

The switches, notably when they are employed in inverters, chop the voltage that they receive. Chopping leads to the presence of abrupt edges that may lead to the presence of static waves on the electrical conductors connecting a converter to the load to which it supplies power. This static wave leads to overvoltages that may prematurely age the load and the components of the associated converter. To mitigate this problem, it is possible to soften the voltage edges generated in the converter. However, this softening is undesirable since it leads to losses at the switches, heating thereof, and therefore premature ageing. One alternative solution consists in filtering the static waves, notably by way of power inductors arranged on the electrical conductors connecting the converter and the load supplied with power. These inductors, and more generally these filters, have the drawback of increasing the mass of the architecture, since all of the power supplied to the load has to pass through the filters.

Among modern electronic switch technologies, mention may be made of components based on materials such as silicon carbide or gallium nitride, with which it is possible to achieve extremely short switching times. It is possible to switch more than 50 volts per nanosecond with this type of technology. It is beneficial to employ this type of switch in converters in order to limit switching losses. However, as soon as it is sought to distance the converter from the load, static waves may be generated on the line connecting the converter to the load. These static waves may produce overvoltages that the load may find difficult to withstand.

SUMMARY OF THE INVENTION

The invention aims to mitigate all of some of the problems mentioned above by proposing, at the load, a passive matching system for the line connecting the converter to the load. The system is extremely simple to implement and does not consume any energy.

To this end, the object of the invention is an electrical architecture comprising a load equipped with power supply terminals allowing it to be connected to an electrical line of the architecture. The electrical architecture comprises, in addition to the connection to the electrical line and associated with each of the power supply terminals, an insulated electrical conductor connected, at a first of its ends, to the terminal under consideration, and not connected at a second of its ends. The insulated electrical conductors have a length greater than or equal to 1 m.

In other words, the insulated electrical conductors form an open line without any connection at their second end.

The insulated electrical conductors advantageously have a constant cross section between their two respective ends.

The insulated electrical conductors advantageously have a length greater than or equal to 3 m.

The electrical architecture advantageously comprises, associated with each of the insulated electrical conductors, an inductor connected in series with the insulated electrical conductor under consideration.

The electrical architecture advantageously comprises a toroidal magnetic core formed around a central recess. The insulated electrical conductors pass through the central recess one or more times.

The electrical architecture advantageously comprises, in addition to the insulated electrical conductors, at least one capacitor connected to the power supply terminals.

The load may be an electric machine comprising a stator housing. The insulated electrical conductors are advantageously wound around the housing.

The insulated electrical conductors may be formed by insulated electrical wires. The insulators of the various electrical wires are advantageously substantially in contact with one another over the majority of their length.

The insulated electrical conductors may be grouped together within a cable.

The cable is advantageously shielded, and the cable shielding is connected to a ground of the architecture.

The insulated electrical conductors may be formed on a flexible printed circuit board.

BRIEF DESCRIPTION OF THE DRAWING

The invention will be better understood and further advantages will become apparent upon reading the detailed description of one embodiment provided by way of example, which description is illustrated by the attached drawing, in which.

For the sake of clarity, the same elements will bear the same references in the various figures.

DETAILED DESCRIPTION

Figure 1:
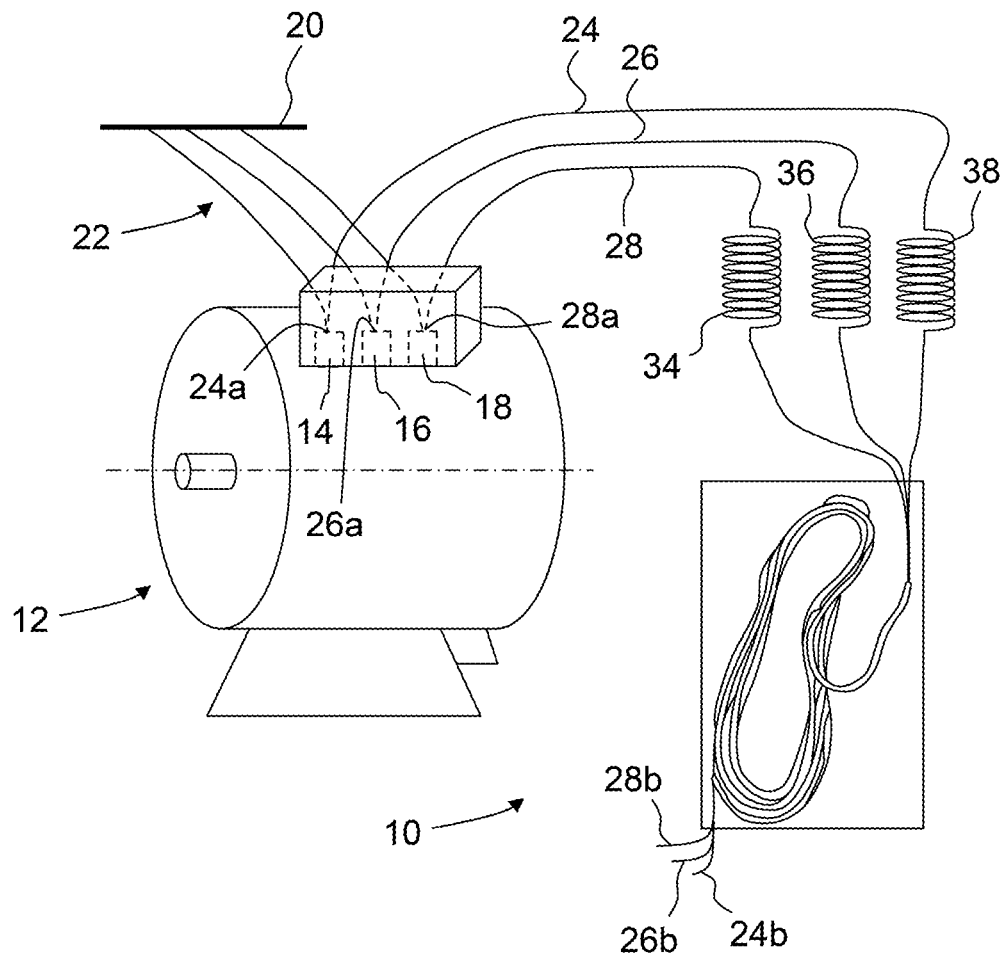
FIG. 1 schematically shows a general example of an electrical architecture according to the invention.

FIG. 1 schematically shows an electrical architecture 10 comprising a load 12 formed by a three-phase electric machine. The electric machine is in this case a rotating motor. In the context of the invention, the electric machine may operate equally as an electrical energy-consuming motor and a generator supplying power to an electrical network. It is possible to employ the invention with any other type of load with or without a rotating part, regardless of the number of phases and whether the load is able to operate as a generator or as an energy consumer.

The load 12 comprises three terminals 14, 16 and 18, one for each of its phases. More generally, the number of terminals is matched to the number of phases. It is possible to provide an additional terminal to connect the neutral of the load if necessary. A single-phase load will generally comprise two terminals. The load 12 is connected to an electrical network 20 by way of an electrical line 22 making it possible to supply power to the load 12. When the load regenerates energy, this is transferred to the network by the cable 22. Some components, such as notably switches, may be arranged in the link between the load 12 and the network 20. Such switches may notably be present in a converter supplying power to the load 12.

Figure 2:
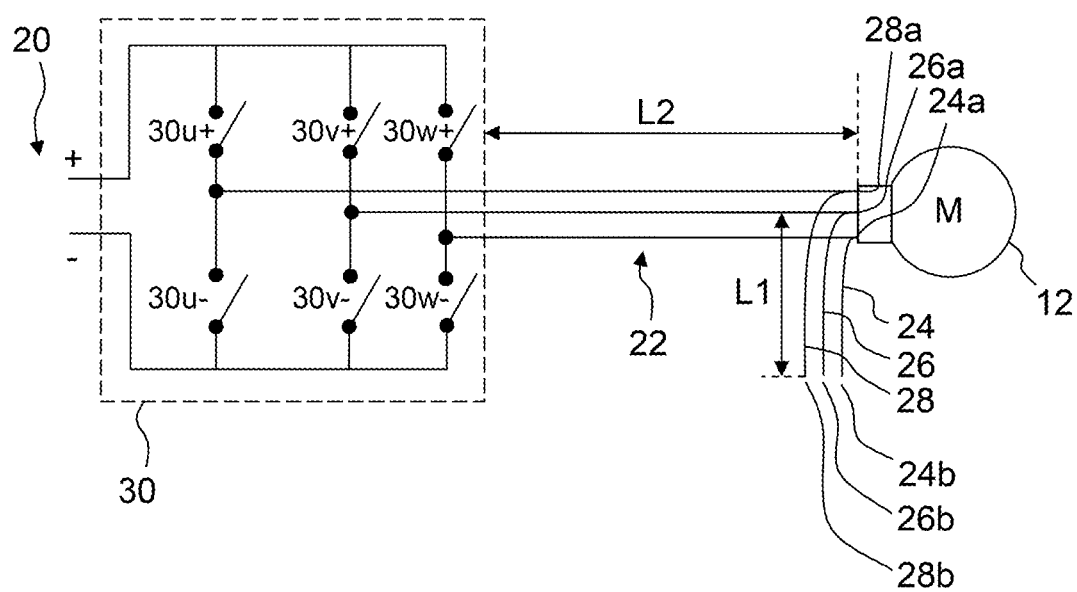
FIG. 2 shows the supply of power to a load by an inverter in more detail.

FIG. 2 schematically shows one example of a converter 30, in the form of an inverter, supplying power to the load 12 through the electrical line 22. The converter 30 receives electrical energy from the network 20 in DC form and supplies the load 12 with electrical energy in a three-phase AC form. The converter 30 comprises three pairs of electronic switches. The pair $30u+$ and $30u-$ makes it possible to generate a first phase u. The pair $30v+$ and $30v-$ makes it possible to generate a second phase v and the pair $30w+$ and $30w-$ makes it possible to generate a third phase w. Between the converter 30 and the load 12, the electrical line 22 has a length L2. Starting from a few metres in length, it has been observed that the occurrence of static waves may occur on the electrical line 22. These phenomena are all the greater when the switches of the converter 30 have short switching times. In addition to the electrical line 22 and independently of the connection of the load 12 to the network 20, an insulated electrical conductor, respectively 24, 26 and 28, is connected to each of the terminals 14, 16 and 18. The electrical conductor 24 comprises two ends 24a and 24b. The end 24a is connected to the terminal 14, and the end 24b is not connected. In other words, the end 24b is isolated from any component of the architecture. The same applies for the other conductors. The conductor 26 is connected to the terminal 16 at its end 26a, and not connected at its end 26b. The conductor 28 is connected to the terminal 18 at its end 28a, and not connected at its end 28b. The insulated electrical conductors 24, 26 and 28 each form an open line without any connection at their end 24b, 26b and 28b. In the absence of connection of the conductors at their second end, 24b, 26b and 28b, this makes it possible to match the electrical line 22 in order to attenuate certain transient electrical phenomena that may be present on the network 20 and transiting through the electrical line 22.

Installing conductors 24, 26 and 28 of infinite length is equivalent to resistors placed between the terminals 14, 16 and 18. More precisely, the insulated electrical conductors form an open line having a characteristic impedance. By placing a resistance of the same value as the characteristic impedance of the open line between each pair of terminals 14, 16 and 18, this gives the same type of attenuation of transient phenomena propagating on the line 22. However, given the voltages required at the terminals of the load 12 in order to make it operate, such resistors would consume a significant amount of energy and should therefore be avoided. Any other type of component placed between the terminals or placed between one of the terminals and an electrical ground of the architecture would also lead to significant electrical consumption, which the invention makes it possible to avoid.

In addition, capacitors generally have markedly worse reliability than that of an electric machine, such as a wound electric motor. For example, certain high-frequency electrical phenomena tend to wear out capacitors. By contrast, the conductors 24, 26 and 28 and their connection to the terminals 14, 16 and 18 are highly reliable, and in any case far better than capacitors, notably with regard to high-frequency electrical phenomena.

In general, an increasing number of static converters are being employed to match the voltage of networks to the requirement of the loads that are connected thereto. These converters allow a substantial saving in terms of mass with respect to conventional transformers. These converters employ electronic switches that perform high-frequency chopping of the voltage present on the network. To achieve good efficiency for a converter, it is beneficial to reduce the duration of transitions between open and closed states of the switches as far as possible. New generations of transistors, for example based on silicon carbide or gallium nitride, make it possible to achieve extremely short transition durations. These rapid transitions lead to abrupt temporal variations in the voltage, which are generally detrimental to the capacitors that are supposed to filter them. By contrast, the conductors connected to the terminals 14, 16 and 18 will not undergo any damage when these transitions occur, while at the same time ensuring filtering thereof due to the line impedance matching.

Keeping the ends 24b, 26b and 28b not electrically connected makes it possible to avoid any significant electric current flowing in the conductors 24, 26 and 28, thereby making it possible to employ conductors with a very small cross section that is in any case far smaller than that of the conductors of the electrical line 22. More precisely, electric machines generally operate at a low frequency, for example at 400 Hz on board an aircraft, and require supply currents of the order of one ampere, or even around ten amperes, flowing in the electrical line 22. The conductors 24, 26 and 28 are connected, at one of their ends, in parallel with the electrical line 22. Due to this, the main supply current to the load 12 does not flow in the conductors 24, 26 and 28, and very small cross sections are sufficient in comparison with the cross sections of the conductors of the cable 22. The added mass caused by the presence of the conductors 24, 26 and 28 thus remains low.

To attenuate the effects of the rapid transitions explained above, it is also possible to install inductors connected in series on the conductors of the electrical line 22. However, such inductors have to withstand the high currents supplied to the load 12, and therefore have a significant mass. Installing the conductors 24, 26 and 28 makes it possible to dispense with these inductors, and tests performed in-house show that, in order to obtain the same filtering level for the transitions, the mass added by the conductors 24, 26 and 28 is far lower than that of the series inductors placed on the electrical line 22.

By way of example, for a three-phase electric motor outputting a power of the order of 30 kW, conductors 24, 26 and 28 with a cross section of 0.2 mm$^2$ and a length L1 of 10 m gave satisfactory results in terms of filtering the transitions. The attenuation effect on transient phenomena is already notable starting from a conductor length L1 of one metre. The same conductor lengths are also contemplated for lower-power electric machines. The faster the transient phenomena, the greater the attenuation effect.

In practice, it is possible to provide a load 12 equipped with insulated conductors each forming an open line with a length L1 of at least 1 m. Such a load may be matched to any type of line 22, regardless of its length L2. The length L1 is defined for each of the conductors 24, 26 and 28 between its two respective ends. The lengths of the three conductors 24, 26 and 28 are advantageously identical: L1. Likewise, the length L2 is defined for the electrical line 22 between the converter 30 and the load 12. The electrical line 22 and the three conductors 24, 26 and 28 may extend rectilinearly, or more generally follow a curve. The respective lengths are defined along the respective curves.

The conductors then allow matching of the electrical line 22. More precisely, seen from the line 22, the impedance of a load such as that of an electric machine that is connected thereto is far greater than that of the electrical line 22. The conductors 24, 26 and 28, with a minimum length L1 of 1 m, match the electrical line 22. In other words, starting from a length L1 of around one metre, the line 22 accompanied by the conductors 24, 26 and 28 may be considered to be a line of infinite length in which rapid transient variations in the voltage from the converter 30 will experience virtually no (or very little) reflection at the connection of the electrical line 22 to the load 12. Figuratively speaking, it may be stated that the transient variations will fade out in the conductors 24, 26 and 28. If it is desired to attenuate the effects of slower transient phenomena, a minimum length L1 of the conductors 24, 26 and 28 of 3 metres is advantageous. For attenuation covering a wider range of transient phenomena, a minimum length L1 of 5 m is even better.

It is possible to further improve the matching of the electrical line 22 at its connection to the load 12 by producing insulated electrical conductors 24, 26 and 28 with a length L1 greater than or equal to a length L2 of the electrical line 22. In other words, the conductors 24, 26 and 28 have a minimum length L1 of one metre, and are advantageously longer if the electrical line 22 has a length L2 greater than one metre.

The conductors 24, 26 and 28 advantageously have a constant cross section between their two respective ends. This firstly makes them easier to produce and secondly makes it possible to control the characteristic impedance of the open line formed by the conductors 24, 26 and 28.

In FIG. 1, the electrical conductors 24, 26 and 28 are essentially arranged at a distance from the load, except of course their end 24a, 26a and 28a connected to the respective terminals 14, 16 and 18. To improve line matching, the insulators of the various conductors are substantially in contact with one another over the majority of their length L1.

FIG. 1 also shows inductors connected in series with each of the conductors 24, 26 and 28. More precisely, an inductor 34 is connected in series with the conductor 24, an inductor 36 is connected in series with the conductor 26 and an inductor 38 is connected in series with the conductor 28. The inductors 34, 36 and 38 are advantageously placed as close as possible to the terminal in question. The main supply current to the load 12 does not flow in the inductors 34, 36 and 38, which may therefore have a mass far smaller than inductors placed in series on the conductors of the cable 22. The inductors 34, 36 and 38 allow the conductors 24, 26 and 28 to better get closer to the characteristic impedance of the electrical line 22. As an alternative, it is possible to place the inductors 34, 36 and 38 still in series with the conductors 24, 26 and 28, but this time at the respective ends 24b, 26b and 28b.

Figure 3:
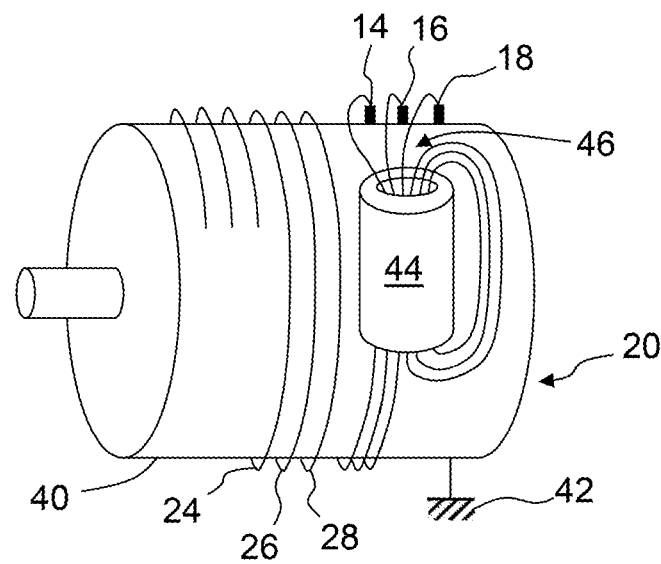
FIG. 3 shows a first embodiment of an electrical architecture according to the invention.

FIG. 3 shows a first embodiment of an electrical architecture according to the invention. The load 12 is also illustrated by a three-phase electric machine. In order not to overload the figure, the electrical connection to the network 20, via the converter 30, is not shown. Just as in the basic depiction in FIG. 1, the electrical conductors 24, 26 and 28 shown in FIG. 3 are formed of conventional insulated electrical wires sold on the market. As explained above, it is possible to choose individual wires with a cross section of around 0.2 mm$^2$. This cross section is known in the literature as AWG 24, AWG standing for "American wire gauge". The insulation of each of the wires may be formed, as is conventional, based on PVC or PTFE if a higher temperature withstand is desirable. The insulation of each of the conductors 24, 26 and 28 is eliminated only at their end 24a, 26a and 28a in order to connect them to the respective terminals 14, 16 and 18. At their end 24b, 26b and 28b, it is possible to supplement the insulation with a cap designed such that only the end 24a, 26a and 28a is electrically connected.

The electric machine 12 shown in FIG. 3 comprises a metal housing 40 inside which the stator of the electric machine 12 is fastened. The housing 40 is connected to an electrical ground 42 of the architecture 10. Unlike in FIG. 1, in FIG. 3, the insulated electrical conductors 24, 26 and 28 are wound around the housing 40. This winding makes it possible to stow the conductors 24, 26 and 28 more easily.

In FIG. 3, the inductors 34, 36, 38 are grouped together by way of a toroidal magnetic core 44 formed around a central recess 46. The magnetic core 44 is for example made from ferromagnetic material. The three conductors 24, 26 and 28 pass through the central recess 46 one or more times depending on the desired inductance value.

Figure 4:
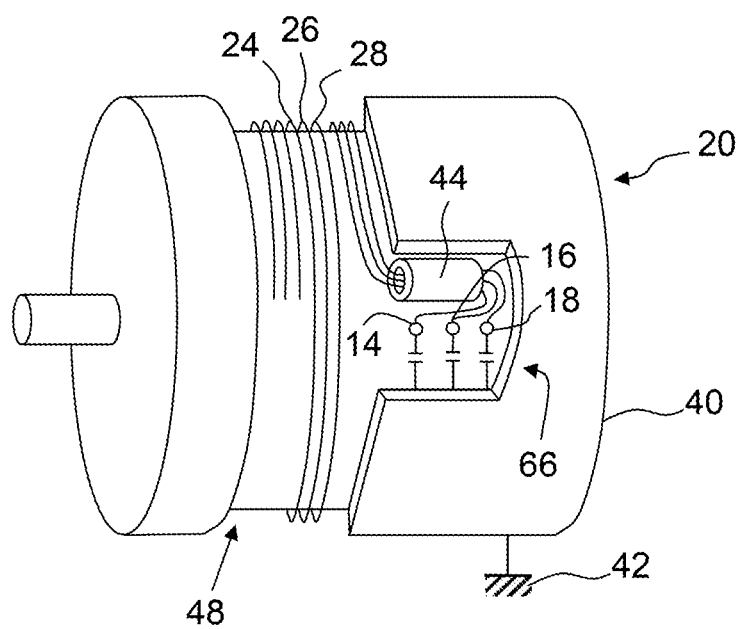
FIG. 4 shows a variant of the first embodiment.

FIG. 4 shows a variant of the first embodiment in which the housing 40 comprises an annular groove 48 in which the conductors 24, 26 and 28 are arranged. In FIG. 4, the conductors are wound in the groove 48 over a single layer. It is also possible to wind them over several layers. The dimensions of the groove 48 are defined so as to allow the conductors 24, 26 and 28 to be stowed completely therein. A cover, not shown, may possibly cover the conductors 24, 26 and 28 in order to protect them. The groove 48 may be extended in order to receive the terminals 14, 16 and 18 and the magnetic core 44. Stowing the conductors 24, 26 and 28 makes it possible to control their position with respect to one another and with respect to the housing 40. Controlling the relative positions makes it possible to control the characteristic impedance of the line formed by the conductors 24, 26 and 28.

Figure 5:
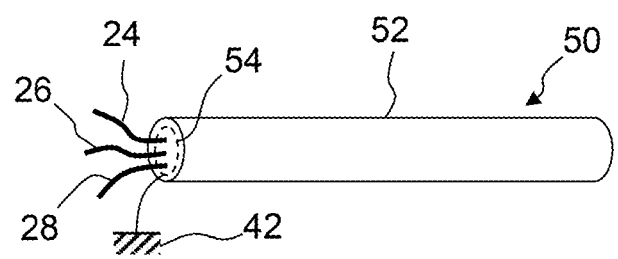
FIG. 5 shows a cable grouping together a plurality of conductors, able to be employed in the first embodiment.

FIG. 5 shows a cable 50 grouping together the conductors 24, 26 and 28. As explained above, the number of conductors contained in the cable depends on the number of terminals of the load. Inside the cable 50, the conductors 24, 26 and 28 may be aligned or twisted. The cable 50 keeps the conductors 24, 26 and 28 inside an external sheath 52. Employing the cable 50 makes it possible to control the relative position of the conductors 24, 26 and 28 with respect to one another. Controlling the position of the conductors 24, 26 and 28 makes it possible to control the characteristic impedance of the conductors 24, 26 and 28 such that this impedance gets as close as possible to that of the electrical line 22. In comparison with individually stowing the conductors 24, 26 and 28 as described by means of FIGS. 3 and 4, using a cable 50 makes it possible to reduce labour costs by purchasing a cable on the market. Using a cable also makes the stowage more reliable, since it is less subject to human influence. The cable 50 may also include a conductive shielding 54 surrounding the conductors 24, 26 and 28. This shielding may be left floating or connected to the ground 42. The shielding 42 makes it possible to match the characteristic impedance of the line formed by the conductors 24, 26 and 28. The shielded cable 50 may also be employed as shown in FIG. 1, where the conductors 24, 26 and 28 are not wound around the housing 40.

Figure 6:
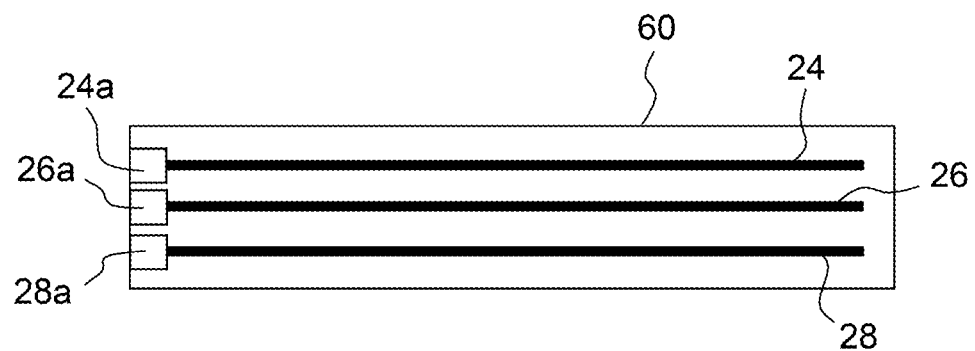
FIG. 6 shows a first variant of a flexible printed circuit board employed in a second embodiment of an electrical architecture according to the invention.
Figure 7:
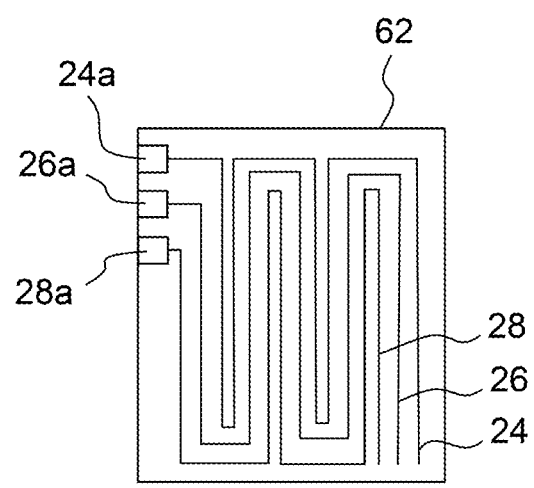
FIG. 7 shows a second variant of a flexible printed circuit board employed in the second embodiment of an electrical architecture according to the invention.

FIGS. 6 and 7 show two variants of flexible printed circuit boards on which the conductors 24, 26 and 28 are produced. In FIG. 6, on the printed circuit board 60, the conductors 24, 26 and 28 each extend rectilinearly from a connection pad forming the first end of the conductor, respectively 24a, 26a and 28a. In FIG. 7, on the printed circuit board 62, the conductors 24, 26 and 28 extend in meandering form. As in the variant in FIG. 5, where a cable 50 is used, employing printed circuit boards makes it possible to control the relative position of the conductors 24, 26 and 28 with respect to one another well.

The flexible printed circuit boards 60 and 62 may be made from polyimide films, also known by the name Kapton. Employing a printed circuit board 60 or 62 makes it possible to guarantee the relative position of the conductors 24, 26 and 28 with respect to one another. The flexibility of the printed circuit boards 60 and 62 makes it easy to stow the conductors 24, 26 and 28, for example around the housing 42. The thickness of the printed circuit boards 60 and 62 is generally far less than that of wires employed to produce the conductors 24, 26 and 28 in the embodiment of FIGS. 3, 4 and 5. This low thickness allows other ways of stowing the conductors 24, 26 and 28 in the architecture 10. In addition to tracks forming the conductors 24, 26 and 28, the printed circuit boards 60 and 62 may comprise several layers, one layer for the tracks and one or two other layers comprising ground planes performing the function of the shielding 54.

In addition to the conductors 24, 26 and 28, it is possible to add capacitors 66 that are for example connected between the terminals 14, 16 and 18 on the one hand and the ground 42 on the other hand. As an alternative or in addition, the capacitors 66 may be connected between the terminals 14, 16 and 18. The capacitors 66 make it possible to filter certain electromagnetic interference coming from the load 12.

The invention claimed is:

1. An electrical architecture comprising:
a load equipped with power supply terminals allowing the load to be connected to an electrical line of the architecture and
an insulated electrical conductor associated with each of the power supply terminals, each insulated electrical conductor comprising two ends and directly connected, at a first of the two ends, to one of the power supply terminals, and not connected at a second of the two ends, each of the power supply terminals being connected to only one insulated conductor, the insulated electrical conductors having a length greater than or equal to 1 m.

2. The electrical architecture according to claim 1, wherein the insulated electrical conductors have a constant cross section between their two respective ends.

3. The electrical architecture according to claim 1, wherein the insulated electrical conductors have a length greater than or equal to 3 m.

4. The electrical architecture according to claim 1, furthermore comprising an energy converter, employing electronic switches, connected to the electrical line and able to supply power to the load, wherein the insulated electrical conductors have a length greater than or equal to a length of the electrical line.

5. The electrical architecture according to claim 1, furthermore comprising, associated with each of the insulated electrical conductors, an inductor connected in series with the insulated electrical conductor under consideration.

6. The electrical architecture according to claim 5, furthermore comprising a toroidal magnetic core formed around a central recess and wherein the insulated electrical conductors pass through the central recess one or more times.

7. The electrical architecture according to claim 1, furthermore comprising, in addition to the insulated electrical conductors, at least one capacitor connected to the power supply terminals.

8. The electrical architecture according to claim 1, wherein the load is an electric machine comprising a stator housing and wherein the insulated electrical conductors are wound around the housing.

9. The electrical architecture according to claim 1, wherein the insulated electrical conductors are formed by insulated electrical wires and wherein the insulators of the various electrical wires are substantially in contact with one another over the majority of their length.

10. The electrical architecture according to claim 1, wherein the insulated electrical conductors are grouped together within a cable.

11. The electrical architecture according to claim 10, wherein the cable is shielded and wherein a shielding of the cable is connected to a ground of the architecture.

12. The electrical architecture according to claim 1, wherein the insulated electrical conductors are formed on a flexible printed circuit board.

\* \* \* \* \*